Jan. 14, 1969  W. P. ROWLAND  3,422,175
METHOD FOR EXTRUDING SYNTHETIC THERMOPLASTIC SHEET MATERIAL
Filed Oct. 23, 1965
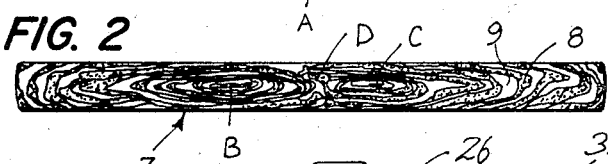
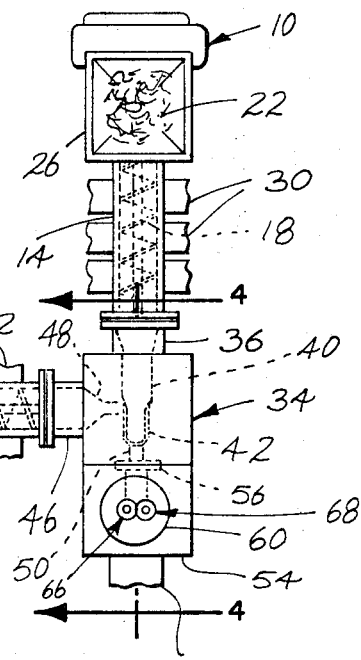
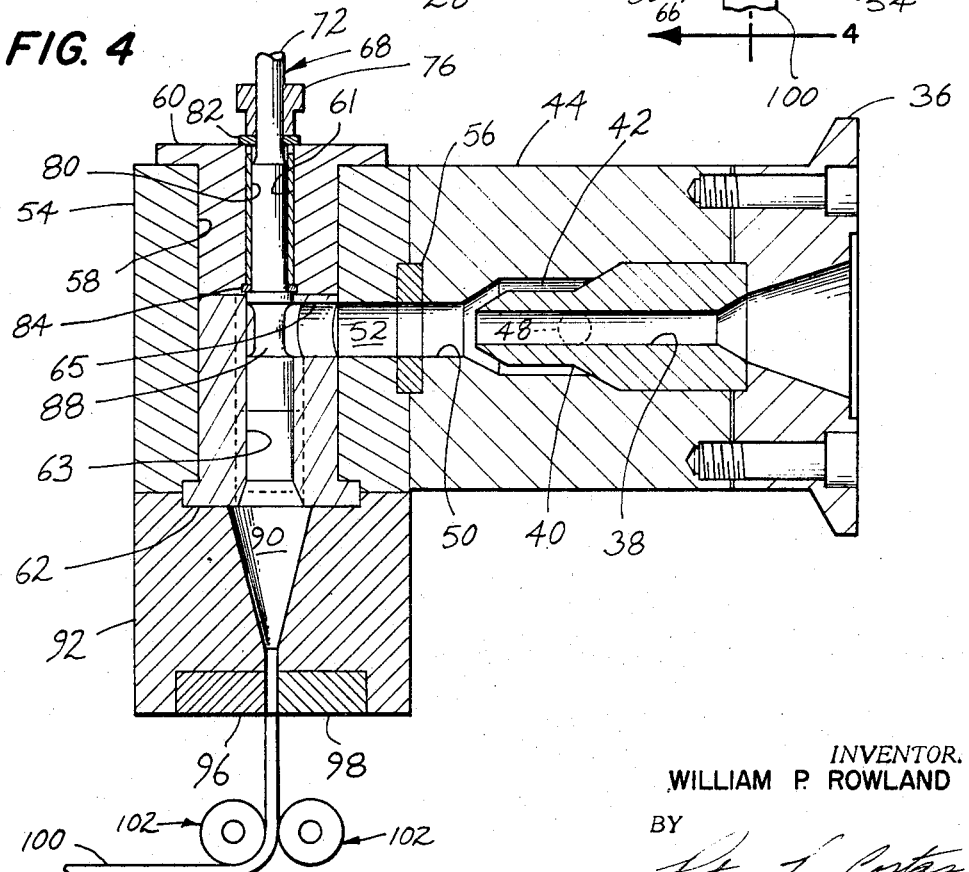
INVENTOR.
WILLIAM P. ROWLAND
BY
ATTORNEY INVENTOR.
WILLIAM P. ROWLAND
BY
*Peter L. Costas*

United States Patent Office 3,422,175
Patented Jan. 14, 1969

3,422,175
METHOD FOR EXTRUDING SYNTHETIC THERMO-PLASTIC SHEET MATERIAL
William P. Rowland, Southington, Conn., assignor to Rowland Products, Incorporated, Kensington, Conn., a corporation of Connecticut
Filed Oct. 23, 1965, Ser. No. 502,984
U.S. Cl. 264—75        13 Claims
Int. Cl. B29f 3/12

ABSTRACT OF THE DISCLOSURE

A plurality of streams of differentially colored fluid synthetic thermoplastic material are combined to provide a composite stream with differentially colored components. Agitation of at least one of the differentially colored components produces swirls thereof, and the swirled stream is extruded to provide sheet material having differentially colored swirls.

---

The present invention relates to the extrusion of synthetic plastic sheet material and, more particularly, to an apparatus and method for producing extruded sheet material having swirled patterns of differentially colored material therein and to the sheet material produced thereby.

Oftentimes, the provision of extruded sheet material with differentially colored layers, or layers and bands, is desirable, particularly for novel decorative effects. Generally, such bands or layers of color extend parallel to the direction of extrusion, and a highly effective apparatus and method for making one form of differentially colored material are described in United States Patent No. 2,985,556, granted May 23, 1961, to William P. Rowland.

The term "differentially colored material" is intended to encompass materials which are visually distinguishable from each other or a first color to provide a visual pattern effect and includes materials containing coloring matter such as dyes and pigments and materials which are substantially transparent to provide distinct coloration and the use of streams of the same color which have distinct optical properties such as by incorporation of optically modifying components such as aluminum flakes which produce variation in light refraction or transmission with resultant visual pattern effect.

It is an object of the present invention to provide a novel and attractive synthetic plastic sheet material having swirls of differentially colored material throughout the length thereof which is adaptable to provide a wide variation in design patterns.

It is also an object to provide a relatively simple and highly efficacious method for extruding such synthetic plastic sheet material having swirls of differentially colored material therein.

Another object is to provide novel extrusion apparatus for conveniently and economically producing sheet having swirls of differentially colored material throughout the length thereof and which is adapted to provide a wide variation in pattern design and which is relatively rugged and economical in construction.

A specific object is to provide a method and apparatus for making such synthetic plastic sheet material with differentially colored swirls therein which is particularly adapted for convenient fabrication of highly attractive eyeglass frames.

Other objects and advantages will be readily apparent from the following detailed specification and claims and the attached drawings wherein:

FIGURE 1 is an end elevational view of one embodiment of synthetic plastic sheet material extruded in accordance with the present invention;

FIGURE 2 is an end elevational view of another embodiment of sheet material;

FIGURE 3 is a fragmentary plan view of an extruder and die assembly embodying the present invention;

FIGURE 4 is a side sectional view to an enlarged scale of the die assembly along the line 4—4 of FIGURE 3;

Figure 5:
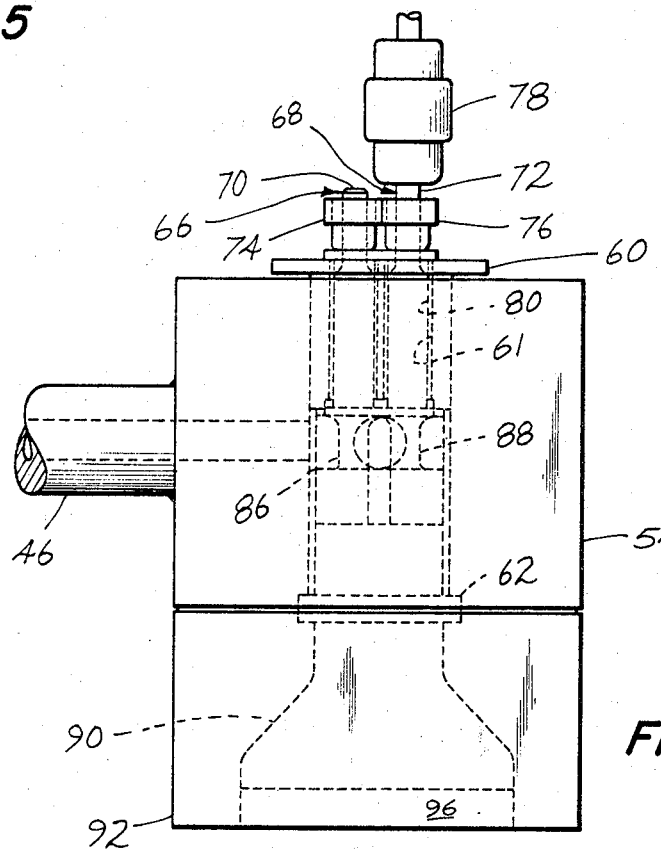
FIGURE 5 is a fragmentary front end elevational view thereof showing the drive motor for the stirring elements.

It has now been found that the foregoing and related objects may be readily attained by a method wherein a plurality of streams of differentially colored fluid synthetic thermoplastic material are combined to provide a composite stream having adjacent differentially colored components extending longitudinally in at least a portion thereof. The composite stream is then subjected to agitation at least in the differentially colored component portion thereof to produce swirls of the differentially colored components which extend transversely of the stream. Thereafter, the swirled stream is extruded to provide synthetic thermoplastic sheet material which has differentially colored swirls at least in a portion of the width thereof to provide an attractive and unusual appearance.

Most desirably, differentially colored components are in adjacent relationship throughout the width of the composite stream although unusual effects can be obtained by providing adjacent differentially colored components only in various portions thereof such as at either side or in only the center. Since various patterns may be utilized for combining the component streams of differentially colored material, the designer is provided with great versatility in terms of the number and types of patterns which he can obtain in the sheet material produced in accordance with the present invention. For example, one color may be provided as a multiplicity of spaced, relatively small diameter cylinders arranged symmetrically about an axis which are encapsulated within a second color, or two colors may be combined in the form of coaxial cylinders. One or more components may be formed within the other with a complex curvilinear polygonal configuration.

Although a single axis of agitation may be employed to effect the winding of the differentially colored components, highly unusual effects can be obtained by using simultaneously a plurality of spaced axes of agitation so as to produce a plurality of swirl patterns having spaced axes. Generally, the axes of agitation will be parallel to the flow of the swirled stream thereafter, although various deviations from such parallel orientation may be provided to effect still further variations in the swirl patterns. Although agitation may be effected in a generally rectilinear conduit extending from the chamber wherein the composite stream is formed to the extrusion die orifice by use of a right angle drive for the agitating elements, ease of die fabrication and operation favors a die assembly wherein the conduit has a bend at the agitators so that the shafts thereof may be directly driven. By use of less or more than a 90° bend with respect to the conduit and agitators to cause variation in the stream flow past the agitators, more variations in the pattern can be effected.

By using a plurality of agitators operating at different speeds or of different configurations, still further variations may be effected. If so desired, variations in the swirl pattern along the length of the sheet may be caused by varying the speed of the agitation either cyclically or irregularly.

More than two colored streams may be employed to provide a multiplicity of colored components. This multiplicity of components may be arranged symmetrically or asymmetrically about the center of the composite stream, thus obtaining even more unusual effects.

In accordance with usual extrusion practice, the conduit for the composite stream narrows prior to passage through the extrusion die orifice so that the swirls are compressed to superpose still another effect. This narrowing may be in both width and height, or only in one direction, or unbalanced in width and height.

The extrusion assembly employed in accordance with the present invention includes a plurality of extruders for supplying a plurality of streams of differentially colored fluid synthetic thermoplastic material and an extrusion die member having a chamber therein and an extrusion orifice in one surface thereof communicating with the chamber. A conduit supplies a first stream of fluid synthetic thermoplastic material at one point in the chamber spaced from the extrusion orifice and another conduit supplies a second stream of differentially colored fluid synthetic thermoplastic material at a second point in the chamber spaced from the extrusion orifice. Means are provided in the chamber for combining the streams of differentially colored material into a composite stream having adjacent differentially colored components in at least a portion of the width thereof. Rotatable means are provided in the die member in the path between the combining means and die orifice for swirling the composite stream to produce swirls of the differentially colored components therein.

It will be readily appreciated that a multiplicity of conduits may be utilized to supply a multiplicity of differentially colored streams of thermoplastic material to the chamber and that suitably constructed and configured combining means may be provided to blend the multiplicity of differentially colored streams into a single composite stream. As previously indicated, the means for swirling the composite stream may take a variety of forms such as paddlewheels, axially spaced agitators and eccentric agitators; in addition, the agitators may also be asymmetric to produce variations during the rotation thereof.

From the standpoint of ease of fabrication and assembly, the extrusion die member is preferably fabricated from a plurality of die blocks so that the chamber in which the streams are combined may be easily fabricated in one block and the agitators easily mounted in a second block attached thereto. A third block may also be employed for mounting adjustable die lips and providing a narrowing in the conduit from the combining chamber to the die orifice.

Referring now in detail to the attached drawings, FIGURE 1 illustrates an extruded sheet embodying the present invention generally designated by the numeral 2 and having swirls of differentially colored components, 4, 6. As can be seen, the swirls of the components 4, 6 are generally symmetrical about an axis A coinciding with the center of the sheet 2 and are elongated in the direction of the width of the sheet 2. The swirls of the components 4, 6 extend longitudinally through the length of the sheet 2 although minor variations in the pattern may occur therealong due to process conditions.

In FIGURE 2, there is illustrated an extended sheet generally designated by the numeral 7 which has two swirled patterns of the differentially colored components 8, 9 having transversely spaced axes B, C. As can be seen, the swirl patterns are quite distinct and symmetrical about the center of the sheet but are not so distinct in the overlapping central portion designated D where the turbulence of the stream produced by the intersection of the two flow patterns produces mixing and irregularity.

Referring now to FIGURES 3–5, therein is illustrated an extruder and die assembly having a main extruder generally designated by the numeral 10 and a cross-head extruder generally designated by the numeral 12. The extruders 10, 12 supply streams of differentially colored thermoplastic material through conduits 14, 16 with screws 18, 20 therein which withdraw and transport synthetic plastic pellets 22, 24 from the hoppers 26, 28. As the plastic pellets 22, 24 are withdrawn, they are heated by the coils 30, 32 to provide molten streams of thermoplastic material to the extrusion die assembly generally designated by the numeral 34.

The molten stream of thermoplastic material from the conduit 14 passes through the adapter block 36 into the bore 38 of a stream combining element 40 which is seated firmly within a cooperatively configured chamber 42 in the die block 44. The molten stream of thermoplastic material from the conduit 16 of the cross-head extruder 12 passes through the adapter block 46 into a conduit portion 48 which carries it into the chamber 42 wherein it flows about the stream combining element 40. In this manner, the stream from the extruder 10 is encapsulated by the stream from the extruder 12 which flows completely about the stream combining element 40 to produce a composite stream of the two component streams having the stream from the extruder 10 in the form of a solid cylinder and the stream of differentially colored material from the extruder 10 in the form of a larger cylinder or annulus thereabout.

This composition stream, then passes from the chamber 42 through a conduit portion 50 into a conduit portion 52 in the die block 54 with the seal element 56 serving to ensure a pressure-tight seal therebetween. Seated within an aperture 58 in the block 54 are a pair of insert elements 60, 62 having aligned bores 61, 63 therein, and the insert element 62 has a conduit portion 65 therein extending between the conduit portion 52 and the bore 63 which also serves as a conduit portion from the chamber 42. Rotatably mounted in the bore 61 of the insert element 60 are a pair of stirring elements generally designated by the numerals 66, 68 which have shaft portions 70, 72 extending outwardly of the block 54 and drivingly interengaged by the gears 74, 76. The shaft 72 is driven by a motor 78 which thus drives both stirring elements 66, 68 which have as bearing supports in the insert element 60 the cylindrical bushings 80 and thrust bearings 82, 84.

The lower ends of the stirring elements 66, 68 are configured to provide spool-like agitator portions 86, 88 which align with the conduit portion 65 so that the composite stream must pass thereby and therearound as it changes direction of flow into the bore 63. Thus, the rotating agitator portions 86, 88 which are driven in opposite direction of rotation produce swirling of the differentially colored components in the composite stream as it passes thereby.

From the bore 63, the swirled composite stream passes into the conduit portion 90 of the die block 92 through the seal element 94. As best seen in FIGURES 4 and 5, the conduit portion 90 widens in one transverse dimension and flattens in the other to produce a relatively shallow stream which is dimensionallly further adjusted by the die lips 96, 98 defining the extrusion orifice. The strip 100 issuing from the die lips then passes into a take-off roll assembly generally designated by the numeral 102 for further processing in accordance with conventional practice.

Thus, it can be seen that the streams from the extruders 10, 12 are combined in the chamber 42 into a composite stream of two coaxial cylinders of differentially colored material which then passes through the stirring elements 66, 68. Here, the differentially colored components are swirled about two axes of agitation to produce two swirl patterns having spaced axes in the width of the stream. As the conduit portion 90 both flattens and widens, the swirls are compacted in one direction and elongated in the other to produce sheet material similar to that illustrated in FIGURE 2.

By use of a single stirring element in place of the two illustrated in FIGURES 3-5, a pattern similar to that illustrated in FIGURE 1 may be obtained. Here there is only one swirl pattern indicative of a single agitator or axis of agitation.

Figures 6, 8:
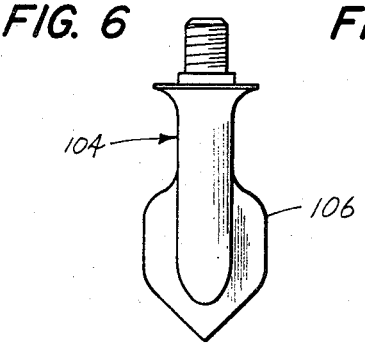
FIGURE 6 is a side elevational view of an alternative stirring element for use in the present invention.
FIGURE 8 is a side elevational view of still another embodiment of stirring element.
Figures 7, 9:
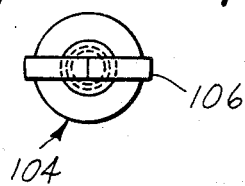
FIGURE 7 is a bottom end view thereof.
FIGURE 9 is a bottom end view thereof.

Referring now to FIGURES 6 and 7, therein illustrated is an alternate embodiment of stirring element generally designated by the numeral 104 which has a spear-shaped agitator 106. This design has been found to be highly advantageous in producing high-speed swirling.

Referring now to FIGURES 8 and 9, there is illustrated still another stirring element generally designated by the numeral 108 which has an agitator portion provided by a pair of axially spaced three-toothed portions 110 which have the teeth thereof circumferentially offset. This type element produces high agitation and some shearing action.

Figure 10:
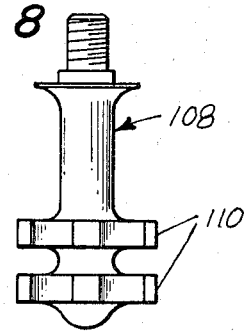
FIGURE 10 is a side elevational view of another embodiment of stream combining.
Figure 11:
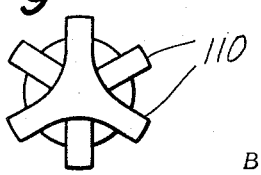
FIGURE 11 is a bottom end view thereof.

Referring now to FIGURES 10 and 11, therein illustrated is an alternative embodiment of stream combining element generally designated by the numeral 112. In this embodiment, a multiplicity of tubes 114 carry the molten stream from the bore 116 beyond the end of the body portion thereof so that the molten stream from the other extruder flows about the tubes and encapsulates a multiplicity of fine streams in a matrix of a different color. This type of element has been highly advantageously in producing fine or thin swirls and avoiding relatively large unswirled portions of a single color.

Although the stirring elements have been shown as disposed in a right angle stream flow, it is possible to employ a right angle drive for the stirring elements, albeit with greater difficulty of fabrication and maintenance of the die assembly. It will be readily apparent that a multiplicity of extruders may be assembled to the extrusion die so as to prodived a composite stream of a multiplicity of differentially colored components. For use with multiple colors, suitable color combining elements adapted to accept the flow from several conduits are provided.

Thus, it can be seen from the foregoing detailed description that the present invention provides a relatively simple and highly efficacious method and apparatus for producing a novel and attractive synthetic plastic sheet material having swirls of differentially colored material throughout the length thereof. The present invention provides great versatility in the apparatus and method so as to permit wide variation in pattern design which can be further increased by varying the speed or providing a difference in speed of spaced stirring elements. The apparatus is capable of rugged and relatively economical construction to provide long, trouble-free operation and is readily adapted to pattern variation by change in the color combining and stirring elements thereof.

Having thus described the invention, I claim:

1. In the method of making synthetic thermoplastic sheet material having differentially colored swirls in at least a portion thereof, the steps comprising: combining a first stream of molten synthetic thermoplastic material and at least one additional stream of differently colored molten synthetic thermoplastic material to provide a composite stream having adjacent differentially colored components extending longitudinally of said composite stream in at least a portion thereof; agitating at least one of said differentially colored components of said stream to produce swirls of said differentially colored components therein; and extruding said swirled stream to provide synthetic thermoplastic sheet material having differentially colored swirls in at least a portion of the width thereof.

2. The method of claim 1 wherein said agitation is provided by rotation of a single agitator to provide a single swirl pattern.

3. The method of claim 1 wherein said agitation is provided by rotation of a plurality of spaced agitators to provide a plurality of swirl patterns having spaced axes.

4. The method of claim 1 wherein, prior to said extruding thereof, said swirled stream is expanded in one transverse dimension and reduced in the other transverse dimension to produce elongated swirls.

5. The method of claim 2 wherein said rotation of said single agitator is at about the midpoint of said stream to produce a substantially symmetrical swirl pattern.

6. The method of claim 3 wherein said agitators are rotated at different speeds to produce varied swirl patterns.

7. The method of claim 1 wherein one of said streams is encapsulated in another of said streams.

8. The method of claim 1 wherein there are several streams of the same colored material which are spaced apart and encapsulated within a stream of a differentially colored material.

9. The method of claim 1 wherein there are two additional streams of differently colored material to provide a composite stream of at least three differentially colored materials.

10. In the method of making synthetic thermoplastic sheet material having differentially colored swirls in at least a portion thereof, the steps comprising: encapsulating in one stream of molten thermoplastic material a stream of a differently colored molten synthetic thermoplastic material to provide a composite stream having differentially colored components extending longitudinally of said composite stream in at least a portion thereof; agitating at least one of said differentially colored components of said composite stream to produce swirls of said differentially colored components therein; expanding said swirled stream in one transverse dimension and reducing said swirled stream in the other transverse dimension to produce elongated swirls; and extending said stream to provide synthetic thermoplastic sheet material having elongated differentially colored swirls in at least a portion of the width thereof.

11. The method of claim 10 wherein said agitation is provided by rotation of a single agitator to provide a single swirl pattern.

12. The method of claim 10 wherein said agitation is provided by rotation of a plurality of spaced agitators to provide a plurality of swirl patterns having spaced axes.

13. The method of claim 10 wherein in said one stream there are encapsulated streams of two differently colored materials.

References Cited

UNITED STATES PATENTS

| 2,632,204 | 3/1953 | Murray | 264—177 |
| 2,646,757 | 7/1953 | Hackmann | 107—1.4 |
| 3,321,804 | 5/1967 | Breidt et al. | 18—13 |

ROBERT F. WHITE, *Primary Examiner.*

G. AUVILLE, *Assistant Examiner.*

U.S. Cl. X.R.

18—13; 264—171